Patented Jan. 6, 1953

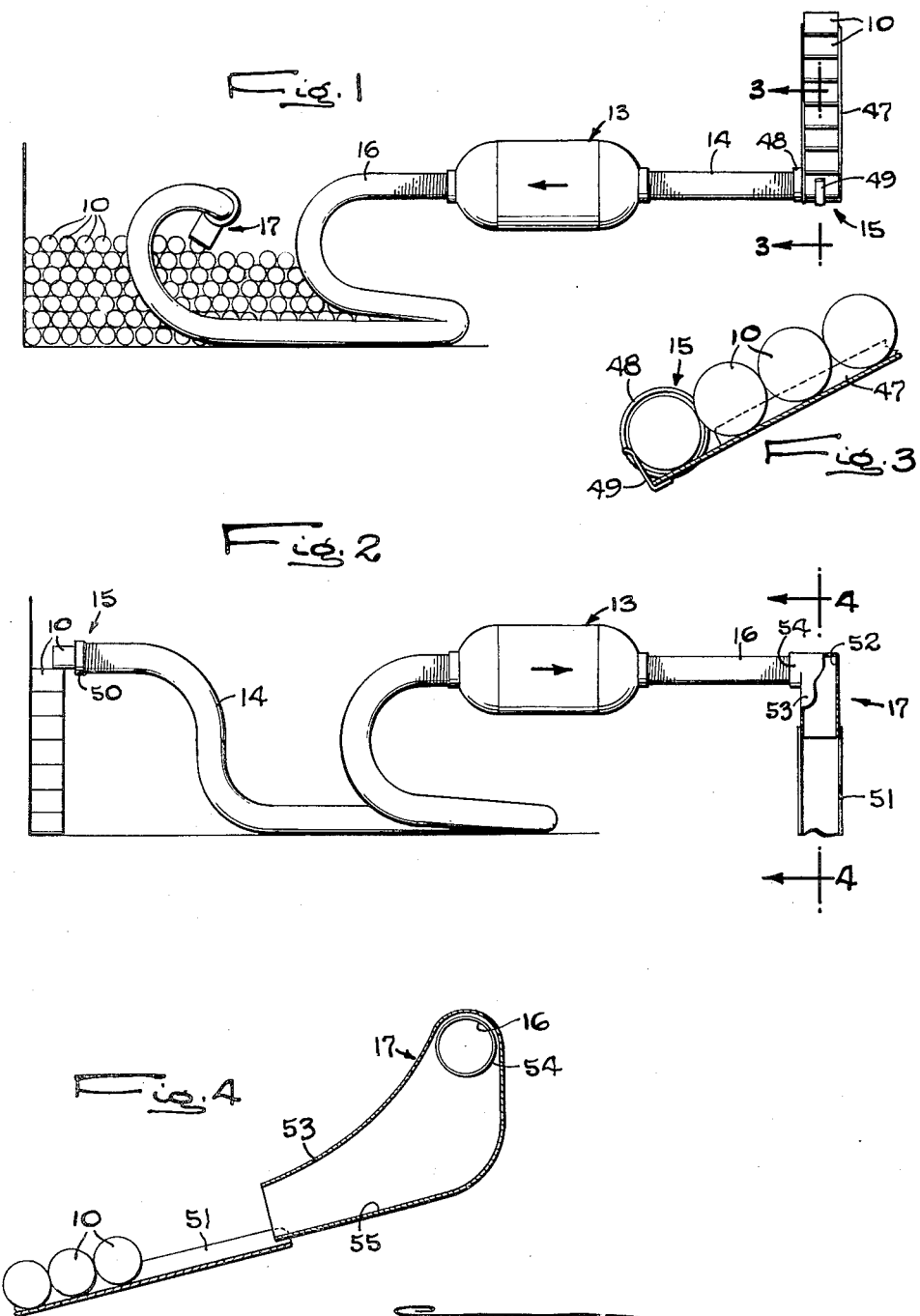

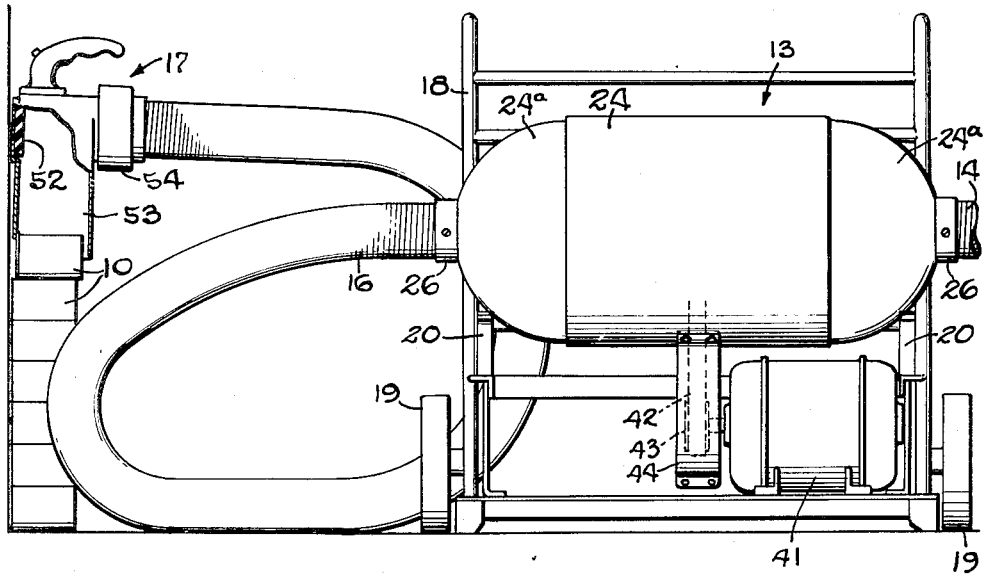
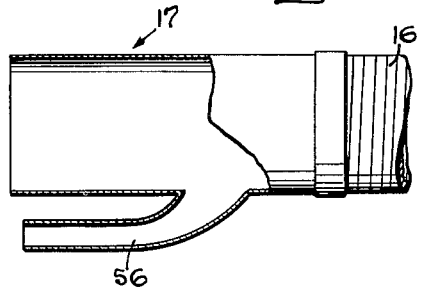
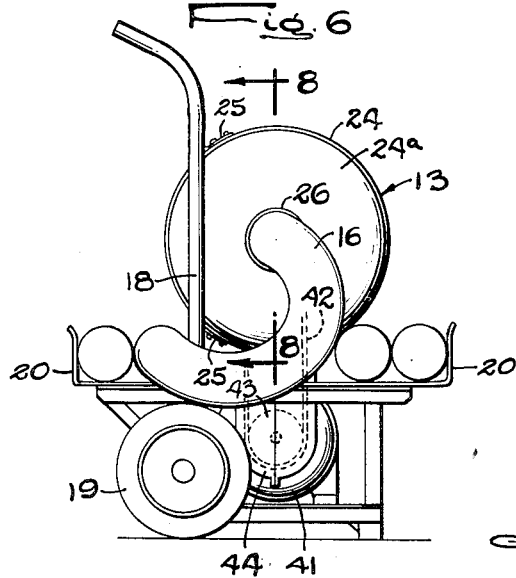

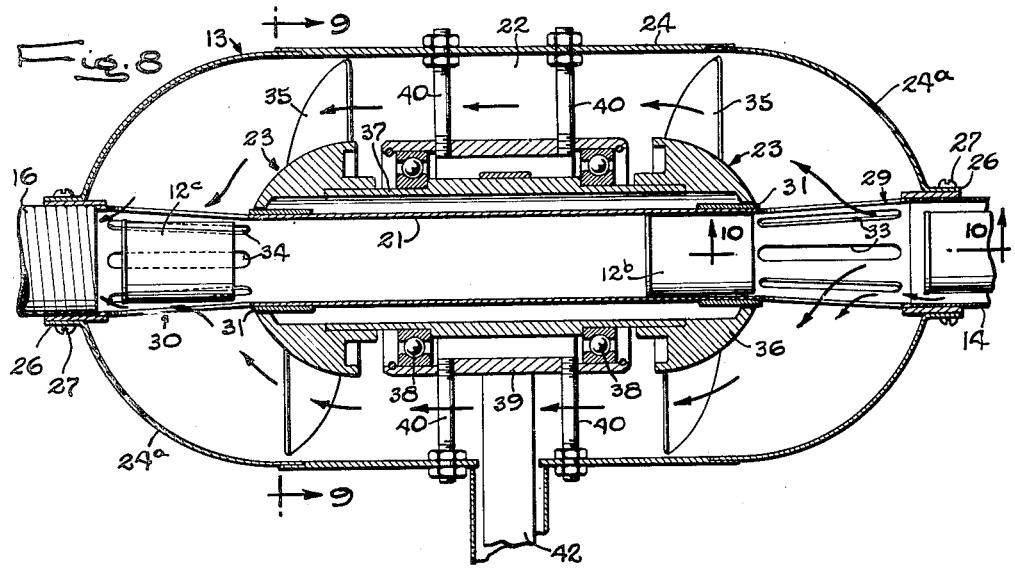
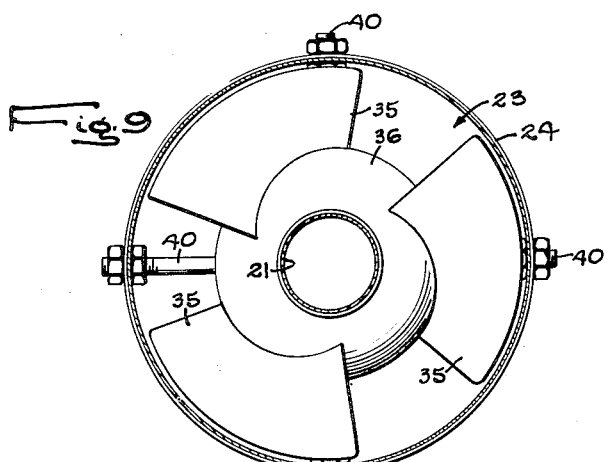
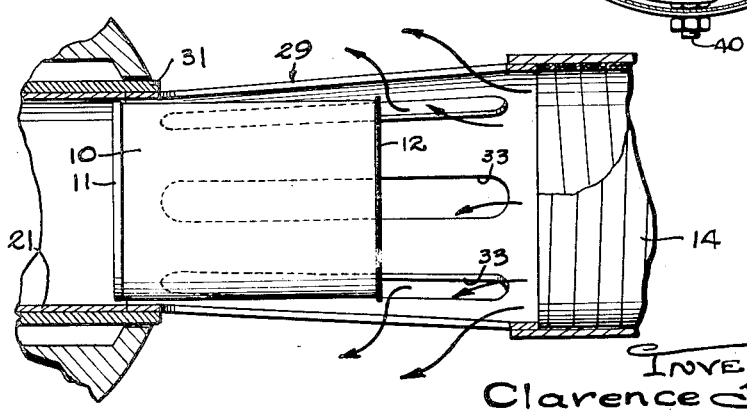

2,624,641

UNITED STATES PATENT OFFICE 2,624,641

CAN DISPATCHING APPARATUS

Clarence J. Smith, Rockford, Ill.

Application September 29, 1949, Serial No. 118,591

12 Claims. (Cl. 302—2)

This invention relates to apparatus for transferring cans between two separated points, and the primary object is to provide a novel apparatus for effecting such transfer without intervening mechanical handling of the cans.

Another object is to transfer the cans through an elongated conduit by the application to opposite end portions of the conduit of subatmospheric and superatmospheric pressures derived from a power driven blower communicating with the conduit intermediate the ends thereof.

A more detailed object is to locate the blower in a by-passage surrounding an intermediate portion of the can transferring conduit.

A further object is to provide a novel construction of that part of the can guideway joining the points of communication between the conduit and the inlet and outlet of the blower.

Other objects and advantages of the invention will become apparent from the following detailed description taken in connection with the accompanying drawings, in which Figure 1 is an elevational view of the main parts of a can loading apparatus embodying the novel features of the present invention and illustrating the manner in which the apparatus is used.

Fig. 2 is a similar view of the apparatus adapted for unloading cans.

Figs. 3 and 4 are fragmentary sectional views taken respectively along the lines 3—3 and 4—4 of Figs. 1 and 2.

Fig. 5 is a fragmentary elevational view of the apparatus shown in Fig. 1.

Fig. 6 is an end view.

Fig. 7 is a fragmentary side view of one form of discharge nozzle.

Fig. 8 is a fragmentary longitudinal sectional view taken along the line 8—8 of Fig. 6.

Fig. 9 is a cross-sectional view taken along the line 9—9 of Fig. 8.

Fig. 10 is a fragmentary view of a part of Fig. 8.

While the invention is susceptible of various modifications and alternative constructions, I have shown in the drawings and will herein describe in detail the preferred embodiment. It is to be understood, however, that I do not intend to limit the invention by such disclosure, but aim to cover all modifications and alternative constructions falling within the spirit and scope of the invention as expressed in the appended caims.

The improved transferring apparatus may be utilized advantageously either in loading (Fig. 1) or unloading (Fig. 2) tin cans 10 which may be closed at both ends as in the case of cans used for condensed milk or the like, or closed at one end by a cover 11 (see Fig. 10) and left open at the other end which may or may not be formed with a narrow outturned flange 12 to which the other end closure is crimped after filling of the can.

The apparatus shown in the drawings for purposes of illustration comprises generally an elongated conduit having opposite end portions 14 and 16 and an intermediate portion 21 forming a guideway through which the cans are transferred under the influence of a vacuum in the inlet portion 14 and superatmospheric pressure in the outlet portion 16, both pressures being derived by the action of a power driven unit 13 which also creates the forces for transferring the cans through the intervening conduit portion 21. Preferably, the portions 14 and 16 of the conduit comprise flexible pipes or tubes such as hose which may be bent readily so that their outer ends may be moved about conveniently to present an intake end or head of the pipe 14 to the cans to be transferred and to locate a discharge head 17 on the outlet pipe 16 at the point where the cans are to be delivered.

Herein, the power unit 13 is mounted on a frame 18 (Figs. 5 and 6) supported by wheels 19 to render the entire apparatus mobile and usable in different locations. The flexible pipes 14 and 16 may be supported in racks 20 (see Fig. 6) on the frame 18 during storage or transportation of the apparatus.

An important aspect of the present invention is the novel construction of the pressure producing unit 13 to effect the transfer of the cans in a straight line between the alined and adjacent ends of the inlet and outlet tubes 14 and 16 primarily by pneumatic action while at the same time creating the sub and superatmospheric pressure by which the cans are moved through the respective inlet and outlet tubes. In general, the unit comprises a central tube 21 through which the cans are guided in their endwise movement through the unit and a surrounding elongated air passage 22 communicating at opposite ends with the guide tube 21 and having one or more power driven impellers 23 therein for inducing the flow of air in the proper direction through the unit.

The air passage 22, which preferably is of annular cross section, is defined in the present instance by a cylindrical casing 24 secured at 25 (Fig. 6) on a part of the frame 18 and having bell-shaped ends 24ª with central axial flanges 26 into which the ends of the tubes 14 and 16 are entered and clamped as by screws 27. The guide tube 21 is of cylindrical cross section having an internal diameter only slightly larger, about one-eighth of an inch, than the maximum diameter of the cans which are thus adapted to slide freely through the tube. The latter is substantially shorter than the over-all length of the casing 24, and the opposite tube ends are coupled to the adjacent ends of the inlet and outlet hose 14 and 16 by sleeves or couplings 29 and 30 each abutting against one end of the tube 21 and held in alinement with the tube by collars 31 thus forming a continuous guideway. These sleeves gradually flare outwardly from the tube diameter to the somewhat larger internal diameter of the connected hose 14 or 16 with which the outer end of the sleeve abuts within the flange 26. The radial clearance between the exterior of the cans 12 and the interior of the hose 14 and 16 is on the order of one-half of an inch so as to allow for the flow of substantial volumes of air through the pipes past the cans therein.

Communication between opposite ends of the air passage 22 and the adjacent ends of the inlet and outlet hose 14 and 16 is effected in a novel manner such as to enable the cans delivered into the central tube 21 and its extension 29 to be used as valves for blocking the inlet end of the tube to permit the remainder of the tube to be placed under a vacuum for drawing the cans on through the tube to a position adjacent the outlet pipe where they become subjected to superatmospheric pressure and blown on into the pipe 16. To these ends, the tapered sleeves 29 and 30 are formed throughout their effective lengths with elongated openings or narrow slots 33 and 34 angularly spaced around the sleeves, each set of openings having a combined area approximately equal to the internal cross section of the inlet and outlet pipes.

In the present instance, two impellers 23 are employed and axially spaced apart along the passage 22 so as to form therewith a two stage blower. As shown, each impeller comprises a plurality of fan blades 35 angularly spaced around and projecting outwardly from a hub 36 fast on one end of a tubular shaft 37. The blades of the two impellers are inclined in the same direction and operate, when rotated, to induce a flow of air along the passage 22. The shaft 37 surrounds and is concentric with the tube 21, and is journaled in spaced antifriction bearings 38 in a larger cylindrical shell 39 which is supported within the casing 24 through the medium of several pairs of bolts 40.

The shaft 37 is driven by an electric motor 41 which may be mounted on the frame 18 beneath the casing 24 and connected to the shaft by a belt 42 which projects through a hole in the bottom of the casing 24 and extends around the shaft and a pulley 43 on the motor shaft. The pulley and the lower end portion of the belt are enclosed in a split housing 44 which covers the opening in the blower casing 24.

During operation of the motor, the fans 23 are turned at relatively high speed drawing air into one end of the casing 24 through the inlet hose 14 and the openings 33 in the tube extension 29. This air is forced along the annular passage 22 inwardly through the openings 34 into the tube extension 30 and then out through the outlet hose 16. Owing to the substantial clearance around the cans within the hose 14 and 16, movement of a substantial volume of air in this manner is continued even though the pipes and the tube 21 may at times become filled by a line of cans. Circulation of the air back through the tube 21 is prevented by virtue of the larger diameter of the hose 16 and also by the action of one or more cans within the tube serving to block the latter and thereby increase the resistance to the flow of air through the tube. As a result of this blocking action, the end portion of the tube 21 adjacent the outlet hose 16 is at times maintained under a vacuum produced by the air flow forced into the outlet hose by the action of the fan blades 35.

The action of the apparatus above described in advancing cans successively through the pipes 14 and 16 is illustrated in Figs. 8 and 10. Since the inlet pipe 14 is maintained under a vacuum by the action of the blower, a can brought into alinement with the inlet end of the pipe will be sucked rapidly therethrough. The force on the can is augmented by the flow of air longitudinally through the clearance space around the exterior of the can. Similar forces are applied to a row of cans accumulating within the pipe, and the entire row will advance as permitted by the advance of preceding cans through the tube 21. In traversing the inlet pipe 14, each can gains considerable momentum which assists in carrying the can through the apertured sleeve 29 and into the tube 21 as the forces which draw the can through the pipe 14 are gradually reduced after the can has moved into the sleeve and its trailing end starts to uncover the openings 33 as illustrated in Fig. 10. Continued advance of the can at this time is assisted by the impingement of the air stream against the trailing end of the can and around the latter as indicated by the arrows in Fig. 10. This force is applied until the can is disposed wholly within the tube 21 as indicated at $12^b$ in Fig. 8.

Owing to the smaller clearance around the can $12^b$ in this position, the tube 21 is blocked against the reverse flow of air therethrough and, as a result of the substantial volume of air being forced by the blower out through the openings 34 and the outlet pipe 16, a vacuum is created ahead of the can within the tube 21 which is of sufficient magnitude to draw the can forwardly through the tube at least until the trailing end of the can uncovers at least a part of the openings 34, the can being then positioned at $12^c$. At this time, the vacuum pressure behind the can is reduced and air from the blower outlet is forced in behind the can creating a superatmospheric pressure for continuing the advance of the can. This force is assisted by the flow of air longitudinally along the exterior of the can as illustrated by the arrows in Fig. 8. Finally, when the can has fully entered the outlet pipe 16, it is blown rapidly through the latter by virtue of the superatmospheric pressure existing in the pipe behind the can.

It will be apparent from the foregoing that the blower is utilized not only to suck the cans through the intake pipe 14, but also to create a vacuum within the tube 21 for moving the cans axially through and beyond the blower to a position at which superatmospheric pressure may be applied behind the can to force it on through the outlet pipe 16. In achieving this action, advantage is taken of the fact that one end of the can is closed so that the can may be utilized effectually as a piston by correlating the internal diameters of the tube 21 and the pipes 14 and 16 with the external diameter of the cans and spacing the tube ends close enough to the outlet end of the inlet pipe 14 to enable each can to be carried by the forces described above across the gap between the inlet pipe outlet and the inlet end of the tube. As a result, the forces applied either to a single can or to a succession of cans at all points along the path of travel are sufficient to advance the cans and transfer the same progressively through a substantial distance. At the same time, the apparatus is of extremely simple construction and adapted to operate reliably through long periods of service use.

The head 15 on the inlet pipe 14 will take different forms depending on whether the apparatus is to be used for stacking the cans in a storage compartment (Fig. 1) or for delivering the cans to a point of ultimate use. In the former case, the end of the flexible pipe is attached to the lower end portion of an inclined track 47 down which the cans to be stacked are delivered from a forming machine or otherwise. For this purpose, the pipe end is inserted in and secured to a ring 48 mounted on the lower end portion of the track and at one side thereof to aline the pipe end axially with the leading can whose downward movement along the track is arrested by engagement with a stop 49. At this time, the closed end of the can is disposed close to the pipe end so that the can is drawn axially into the pipe by the vacuum created within the latter in the manner described above.

When the apparatus is used for unloading cans stacked in horizontal rows as shown in Fig. 2, the intake nozzle 15 may take the form of a simple ring 50 fitting onto the end of the hose 14. By bringing the ring adjacent to and into alinement with the successive cans in a row, the latter will be drawn one by one into the pipe.

The outlet or discharge head 17 will also vary in construction depending on whether the cans are to be stacked in storage as shown in Fig. 1 or delivered to a track 51 (Figs. 2 and 4) for further transfer to a point of use. In each instance, the head is formed with an abutment 52 axially spaced from the end of the hose 16 a distance somewhat greater than the length of a can and forming one wall of a chute 53 which opens downwardly and transversely of the axis of the outlet hose and is shaped to release the cans in the desired position. Thus, the head may comprise an open sided casing slightly wider than the length of a can having a flange 54 fitting over or swiveled on the end of the outlet hose and a bottom 55 connected to the end of the track 51 and inclined downwardly to deliver the cans by gravity to the track. If desired, the abutment 52 may be formed of yieldable material such as rubber to cushion the impact between the can and the abutment.

With the arrangement thus described, each can discharged under pressure from the hose 16 will come against the abutment 52 and the pressure behind the can will be released due to the spacing of the trailing end of the can away from the end of the pipe. The can, with the assistance of gravity, is blown laterally into and out through the chute 53 and moves out of the opening therein either onto the track 51 (Fig. 4) or onto the previously deposited row of cans (Fig. 1). In the latter case, the cans may be arranged in a row simply by moving the head 17 laterally across the storage compartment.

Instead of delivering the cans laterally, the head 17 may be constructed as shown in Fig. 7 to discharge the cans axially against a wall of the storage compartment or the wall formed by the previous stack of cans. In this case, the nozzle simply comprises a cylindrical tube preferably having an auxiliary air outlet 56 disposed adjacent and below the head 17 and opening in a direction parallel to the can axis. Air thus escapes from the outlet 56 in a stream which is directed against the can in the next lower horizontal row so as to push the latter into full abutment with the face of the previously formed stack. In such a case, slight rebounding of the cans while one row is being formed is unobjectionable because these cans will become located properly by the auxiliary air stream during the formation of the next horizontal row of cans.

I claim as my invention:

1. Apparatus for transferring cans having, in combination, an elongated stationary tube of an internal diameter slightly larger than the cans to be transferred, inlet and outlet pipes of larger internal diameter than said cans with their adjacent ends axially alined with and spaced outwardly from opposite ends of the tube, tubular couplings each connecting one end of said tube to the adjacent pipe apertured for the free flow of air laterally into or out of the tube, a casing surrounding said tube and contracted at its ends around the outermost ends of said couplings whereby to provide a passage extending along the exterior of said tube from one end of said casing to the other, a tubular shaft surrounding said tube, means mounted within said casing and rotatably supporting said shaft, an impeller fast on said shaft and mounted in said passage to rotate about the axis of said tube and induce a flow of air longitudinally through said passage, a rotary power actuator disposed externally of said casing, and a belt driven by said actuator and driving said shaft.

2. Apparatus for transferring cans having, in combination, an elongated stationary tube of an internal diameter slightly larger than the cans to be transferred, inlet and outlet pipes of larger internal diameter than said cans with their adjacent ends axially alined with and spaced outwardly from opposite ends of the tube, tubular couplings each connecting one end of said tube to the adjacent pipe apertured for the free flow of air laterally into or out of the tube, a casing surrounding said tube and contracted at its ends around the outermost ends of said couplings whereby to provide a passage extending along the exterior of said tube from one end of said casing to the other, a tubular shaft surrounding said tube, means mounted within said casing and rotatably supporting said shaft, an impeller fast on said shaft and mounted in said passage to rotate about the axis of said tube and induce a flow of air longtiudinally through said passage, a rotary power actuator disposed externally of said casing, and a drive connection driven by said actuator and transmitting rotary power through said casing to said shaft to rotate the latter.

3. Apparatus for transferring cans having, in combination, an elongated stationary tube of an internal diameter slightly larger than the cans to be transferred, inlet and outlet pipes of larger internal diameter than said tube with their adjacent ends axially alined with and spaced outwardly from opposite ends of the tube, tubular couplings each connecting one end of said tube to the adjacent pipe and gradually flaring axially, each of said couplings being apertured for the free flow of air laterally into or out of the tube, a casing surrounding said tube and contracted at its ends around the outermost ends of said couplings whereby to provide a passage of annular cross section extending along the exterior of said tube from one end of said casing to the other, an impeller mounted in said passage to rotate about the axes of said tube and induce a flow of air longitudinally through said passage, and a power actuator disposed externally of said casing and operable to drive said impeller whereby to draw air from said inlet pipe into said passage through the opening in one of said couplings and force the air through the opening in the other coupling and into said outlet pipe.

4. Apparatus for transferring cans having, in combination, an elongated stationary tube of an internal diameter slightly larger than the cans to be transferred, inlet and outlet pipes of larger internal diameter than said tube with their adjacent ends axially alined with and spaced outwardly from opposite ends of the tube, tubular couplings each connecting one end of said tube to the adjacent pipe and gradually flaring axially, each of said couplings being apertured for the free flow of air laterally into or out of the tube, a casing surrounding said tube and contracted at its ends around the outermost ends of said couplings whereby to provide a passage of annular cross section extending along the exterior of said tube from one end of said casing to the other, an impeller mounted in said passage to rotate about the axes of said tube and induce a flow of air longitudinally through said passage, and a power actuator operable to rotate said impeller whereby to draw air from said inlet pipe into said passage through the opening in one of said couplings and force the air through the opening in the other coupling and into said outlet pipe.

5. Apparatus for transferring cans having, in combination, an elongated stationary tube of an internal diameter slightly larger than the cans to be transferred, inlet and outlet pipes of larger internal diameter than said tube with their adjacent ends axially alined with and spaced outwardly from opposite ends of the tube, couplings extending between each end of said tube to the adjacent pipe and gradually flaring axially, each of said couplings being apertured for the free flow of air laterally into or out of the tube, a casing surrounding said tube and contracted at its ends around the outermost ends of said couplings whereby to provide a passage extending along the exterior of said tube from one end of said casing to the other, and a power driven impeller mounted in said passage to rotate about the axes of said tube.

6. Apparatus for transferring cans pneumatically from one point to another comprising in combination an inlet tube section, a delivery tube section, and a fixed intermediate tube section therebetween, each of said tube sections providing track portions continuous therein along which cans or the like may be propelled, the track portions of said tube sections being maintained in alignment so that the positioning of the cans projected therethrough will be continuously controlled, a blower in by-pass relation to said intermediate tube section, and conduit means extending from the juncture of the inlet and intermediate tube sections to the blower and from the blower to the juncture of the intermediate and outlet tube sections, whereby air propelled by the blower will be drawn through the inlet tube section and propelled through the outlet tube section to effect the propulsion of cans through all said tube sections in sequence.

7. Apparatus as in claim 6, wherein the blower comprises a rotary blade member embracing and rotatable about said fixed intermediate tube section.

8. Apparatus as in claim 6, wherein said blower comprises a pair of rotary blade members in stage relationship, and embracing and rotatable about said fixed intermediate tube section.

9. Apparatus as in claim 6, wherein said blower comprises a rotary blade member embracing and rotatable about said fixed intermediate tube section, in combination with drive means for the blower eccentrically disposed in relation to said intermediate tube section.

10. Apparatus as in claim 6, wherein said inlet and outlet tube sections are formed of flexible tubing, and said intermediate tube section comprises a rigid conduit piece.

11. In an apparatus for dispatching cans pneumatically from one point to another, the combination of, an elongated can guideway comprising a conduit extending between said points and having axially spaced portions with lateral openings therein and diverging axially away from each other, the intervening portion of the conduit being slightly larger than the cans to be dispatched and smaller than the outer end portions, an impeller encircling said intervening portions and rotatable about the axis thereof to induce air to flow through said end and open portions successively while by-passing said intervening portion, and means confining the flow of air around said intervening portion to place the outlet end thereof under subatmospheric pressure when a can is disposed within the inlet end thereof.

12. Apparatus as in claim 6, wherein the track portions of said inlet, delivery and intermediate tube sections are shaped and arranged to engage the side walls of the cans, whereby the cans are propelled and maintained in their movement through said tube sections in end to end alignment.

CLARENCE J. SMITH.

REFERENCES CITED

The following references are of record in the file of this patent:

UNITED STATES PATENTS

| Number | Name | Date |
|---|---|---|
| 149,114 | Grieser | Mar. 31, 1874 |
| 444,038 | Beach | Jan. 6, 1891 |
| 2,342,680 | Melzer | Feb. 29, 1944 |